UNITED STATES PATENT OFFICE.

LEWIS S. CHICHESTER, OF NEW YORK, N. Y.

IMPROVEMENT IN PREPARED CEREALS.

Specification forming part of Letters Patent No. 215,573, dated May 20, 1879; application filed August 22, 1878.

*To all whom it may concern:*

Be it known that I, LEWIS S. CHICHESTER, of the city and State of New York, have invented an Improvement in Prepared Cereals, of which the following is a specification.

Cereals have been cooked by steam, both in a whole and in a ground or crushed condition, and such cereals have been dried and put up in packages for market. Cereals prepared in this manner are not well adapted to bread-making, or for cakes and other articles of food that require to be fermented before cooking, because the steam-cooking in the process of manufacture destroys or lessens the raising or leavening properties of the cereals.

My present invention consists in the combination of steam-cooked cereals in the form of meal or flour, combined with uncooked flour or meal, the two being intimately mixed together, so as to be a merchantable article. The corn-meal or other material that requires considerable time to thoroughly cook it is, therefore, in a condition to need but little subsequent cooking, and the uncooked wheat or other flour is in a condition to be acted upon by the baking-powder or other leavening material.

I am aware that baking-powder and leavening material have been mixed with ordinary flour before it is sold. This, therefore, is not my invention. I remark, however, that any suitable or desired leavening material is to be introduced into the combined cooked and uncooked cereals, either by the person using the same or into the package before it is sold. The cooked cereal tends to prevent injury to the uncooked flour mixed with it, and but little time is required to cook the food as made from this improved mixture of cereals.

My present invention consists in prepared cereals put up in a form adapted to bread, cakes, and other articles of food, such cereals being composed of steam-cooked flour or meal and uncooked flour or meal mixed together in the proper proportions, so that the uncooked flour will undergo fermentation after being mixed with water, and cause the dough to rise or become leavened and in a condition for use. The cooked cereals, however, prevent the risk of injury to the merchantable package while on sale, and also render it unnecessary to cook the food for so long a time as required for uncooked cereals.

I employ Indian corn, wheat, oats, rye, or a mixture of two or more of these cereals. They are in a thoroughly cooked and dry condition. To cook these cereals any suitable steaming or steam-cooking apparatus is employed; and as steamers for cooking rice and other materials in a pot containing boiling water are well known, I remark that any such apparatus of a sufficient size may be used. The cereals are thoroughly dried by any suitable means after being steam-cooked.

I have found by experience that cereals that are only crushed or ground and steam-cooked are not adapted to use where the article of food is raised or leavened. I introduce flour or meal with the steam-cooked cereals, in order that the leavening material may act upon the uncooked meal or flour.

Maize or Indian corn has not heretofore been as extensively used as an article of food as its nutritious properties warrant, because there are few persons that understand how to make the same palatable. I have also found that meal or crushed cereals are not well adapted for use in connection with leavening material; I therefore prefer and use the uncooked material in the form of finely-ground flour, and find that wheat or rye is the best adapted to use with the leavening material.

In all instances the uncooked cereal is mixed with the cooked cereals in the proper proportion—say one part of uncooked to one or two parts of cooked cereal. The cooked and uncooked crushed and ground material might be put up in packages and sold; but it is preferable to introduce leavening material, such as soda, cream of tartar, or other suitable substance, in the proper proportion previous to placing the prepared cereals in packages. The cereal thus prepared is ready to be mixed and baked or otherwise cooked, the uncooked flour being fermented or acted upon sufficiently to leaven the mass previous to or during the cooking. Bread, cakes, puddings, muffins, crackers, and other articles of food can be made from these prepared cereals. Of course eggs, spice, and other flavoring substances may be added, according to the article to be produced; and in consequence of the Indian corn or other cereal that forms at least half the bulk, and generally requires the longest time, being thoroughly cooked before being put up for market, the subsequent cooking of the article of food requires but little time.

I am aware that various vegetable substances, such as grain, flour, and meal, have been thoroughly cooked, dried, and sold in packages; also, that grains or cereals of different kinds or qualities have been mixed and put up in packages for sale, and that corn has been dried after being exposed to steam, and then ground and mixed with wheat-flour; but the corn was not cooked. None of these methods of preparing produces the same material as I employ, for either the corn or other meal is not cooked, or else there is nothing that will ferment with rapidity. In my improved article of food the corn or other meal is in a thoroughly-cooked condition, and the uncooked flour ferments under the action of the leavening material.

I claim as my invention—

The new article adapted to use as food, consisting of ground or crushed steam-cooked cereals and uncooked flour or meal mixed together, substantially as set forth.

Signed by me this 20th day of August, A. D. 1878.

LEWIS S. CHICHESTER.

Witnesses:
 HAROLD SERRELL,
 WILLIAM G. MOTT.